United States Patent
Wachter et al.

(10) Patent No.: US 7,001,302 B2
(45) Date of Patent: Feb. 21, 2006

(54) DIFFERENTIAL DRIVE WITH LIGHTWEIGHT DIFFERENTIAL CARRIER

(75) Inventors: Christian Wachter, Germaringen (DE); Bruno Zweier, Altenstadt (DE); Elmar Schmid, Germaringen (DE); Jochen Balken, Buchenberg (DE); Werner Krude, Neunkirchen-Seelscheid (DE)

(73) Assignee: GKN Automotive GmbH, (DE)

( * ) Notice: Subject to any disclaimer, the term of this patent is extended or adjusted under 35 U.S.C. 154(b) by 24 days.

(21) Appl. No.: 10/620,583

(22) Filed: Jul. 16, 2003

(65) Prior Publication Data

US 2004/0127323 A1 Jul. 1, 2004

(30) Foreign Application Priority Data

Jul. 26, 2002 (DE) ................ 102 34 035

(51) Int. Cl.
*F16H 48/06* (2006.01)
*F16H 57/02* (2006.01)
*F16G 13/02* (2006.01)

(52) U.S. Cl. .............. 475/230; 475/222; 74/606 R
(58) Field of Classification Search ........... 475/220, 475/222, 230, 243, 245, 247; 74/606 R, 74/607

See application file for complete search history.

(56) References Cited

U.S. PATENT DOCUMENTS

| | | | | |
|---|---|---|---|---|
| 1,145,295 A | | 7/1915 | De Witt | |
| 2,187,843 A | * | 1/1940 | Rzeppa | 475/222 |
| 2,408,926 A | * | 10/1946 | Griffith | 475/245 |
| 2,548,258 A | * | 4/1951 | Griffith | 475/245 |
| 3,030,825 A | * | 4/1962 | Diederich et al. | 475/222 |
| 3,137,181 A | * | 6/1964 | Guilbert | 475/245 |
| 3,202,016 A | * | 8/1965 | Arnold | 475/237 |
| 3,427,900 A | * | 2/1969 | Walker | 475/243 |
| 4,635,505 A | * | 1/1987 | Williamson | 475/184 |
| 4,977,796 A | * | 12/1990 | Littke | 74/665 T |
| 6,623,396 B1 | * | 9/2003 | Szalony et al. | 475/230 |

FOREIGN PATENT DOCUMENTS

| | | |
|---|---|---|
| DE | 41 36 955 A1 | 5/1993 |
| EP | 0 730 109 A1 | 9/1996 |
| FR | 2 114 558 | 6/1972 |
| GB | 1 371 060 | 10/1974 |

* cited by examiner

*Primary Examiner*—Roger Pang

(57) ABSTRACT

A differential drive having a drive housing in which a differential carrier (14) is rotatably supported around its longitudinal axis (A). The drive has sideshaft gears (18, 19) which are supported so as to be rotatable relative to the differential carrier (14) around the axis (A), and differential gears (22) which are supported in the differential carrier rotatably around axes (R) extending radially relative to the longitudinal axis (A), which engage the sideshaft gears (18, 19) and which rotate together with the differential carrier (14). The differential carrier (14) forms journals (16, 17) which extend co-axially relative to the longitudinal axis (A) and by means of which the differential carrier (14) is rotatably supported in the sideshaft gears (18, 19) and wherein the sideshaft gears (18, 19), in turn, are rotatably supported in the drive housing.

13 Claims, 7 Drawing Sheets

DIFFERENTIAL DRIVE WITH LIGHTWEIGHT DIFFERENTIAL CARRIER

TECHNICAL FIELD

The invention relates to a differential drive having a drive housing in which a differential carrier is rotatably supported around its longitudinal axis A. Sideshaft gears are supported so as to be rotatable around longitudinal axis A relative to the differential carrier. Differential gears are supported in the differential carrier rotatably around axes R extending radially relative to the longitudinal axis A. The differential gears engage the sideshaft gears and rotate together with the differential carrier.

BACKGROUND OF THE INVENTION

Open differential drives of the foregoing type are preferably used in the form of axle differentials in driving axles of motor vehicles with a low or medium performance. In other words, they are particularly suited for lightweight construction and easy assembly in respect of such a differential drive rather than high performance.

From U.S. Pat. No. 1,145,295, there is known an axle differential wherein sideshaft gears, on the outside, run on a multi-part differential carrier, with the sideshaft gears themselves being supported directly in the drive housing. The differential carrier comprises a disc member forming a crown gear, and a square shaft inserted into same. Two sliding sleeves are arranged on the square shaft. The differential gears have been inserted into broken-out portions in the differential carrier. The sideshaft gears are each supported in rolling contact bearings. The open differential can be adjusted by the sliding sleeves in such a way that one of the sideshaft gears is disconnected from the differential carrier and that the other one of the sideshaft gears is connected to the differential carrier in a rotationally fast way.

FR 2,114,558 proposes a differential drive wherein the side-shaft gears are supported on the outside on a differential carrier. The application discloses that the side-shaft gears can be produced so as to be integral with the outer joint parts of constant velocity universal joints. The differential carrier is supported in the differential housing by a crown gear which is integrally formed on to the differential carrier and which, in one piece, forms the inner bearing race of a rolling contact bearing, with the outer bearing race being inserted into the drive housing.

SUMMARY OF THE INVENTION

The present invention provides a differential drive having a lightweight construction that is easy to assembly. In one embodiment, a differential drive is provided wherein the differential carrier forms journals which are firmly connected to one another, and which extend coaxially relative to the longitudinal axis A. From the journals, the differential carrier is rotatably supported in the sideshaft gears and the sideshaft gears, in-turn, are rotatably supported in the drive housing. Thus, the differential carrier is indirectly supported via the sideshaft gears in the drive housing. In this way, it is possible to provide a particularly lightweight differential drive with a few parts only, which is very easy to assemble. The sideshaft gears can be supported by rolling contact bearings in the drive housing. Prefabricated assemblies consisting of the differential carrier and inserted differential gears on the one hand, and sideshaft gears with slipped-on rolling contact bearing on the other hand, can be combined in the drive housing and secured by axial securing means for the rolling contact bearings in the drive housings.

The regions of tooth engagement between the sideshaft gears and the differential gears are located outside the differential carrier. In a particularly advantageous way, the coaxial journals at the differential carrier can be provided in the form of hollow journals which are integrally connected to one another. Furthermore, the differential gears can be inserted into axial broken-out regions in a central disc member of the differential carrier. The disc member, furthermore, serves to form a ring gear or to fix a ring gear on. In a particularly advantageous embodiment, the sideshaft gears are integrated with outer joint parts of constant velocity universal joints. Hereafter, the sideshaft gears and outer joint parts can be joined after the rolling contact bearings have been slipped on to the sideshaft gears. In this way, the rolling contact bearings are axially mounted between the sideshaft gears and the outer joint parts. The connection can be produced by laser welding or friction welding. The rolling contact bearings are preferably provided in the form of angular contact roller bearings. The pre-assembled modules each comprising a side-shaft gear, an outer joint part and a rolling-contact bearing are insertable into the drive housing along the longitudinal axis A and can be slid on to the journals of the differential carrier and secured in the differential housing. The differential carrier is preferably supported in friction bearings in the sideshaft gears, and the effective lines of load of the rolling contact bearings can pass axially centrally through bearing regions of the differential carrier in the sideshaft gears.

The sideshaft gears and the differential gears can be provided in the form of bevel gears. However, a combination of crown gears and spur gears is also possible.

Other advantages and features of the invention will also become apparent upon reading the following detailed description and appended claims, and upon reference to the accompanying drawings.

BRIEF DESCRIPTION OF THE DRAWINGS

For a more complete understanding of this invention, reference should now be made to the embodiments illustrated in greater detail in the accompanying drawings and described below by way of examples of the invention.

In the drawings.

DETAILED DESCRIPTION OF THE INVENTION

In the following description, various components and features are described for several embodiments. These specific features and components are included as examples and are not meant to be limiting.

Figure 1:
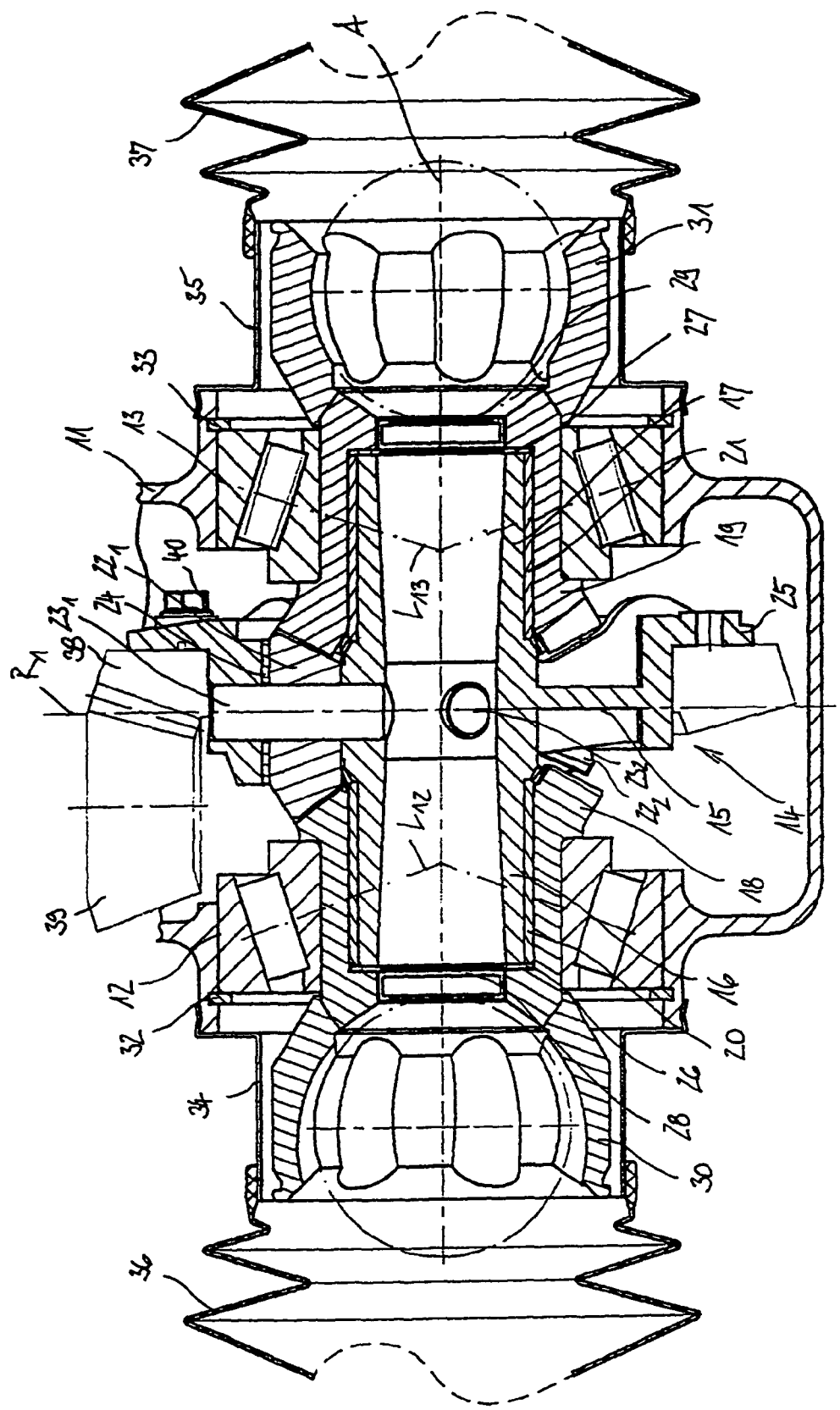
FIG. 1 shows one embodiment of an inventive differential drive in a section through its longitudinal axis.

FIG. 1 shows an inventive differential drive with its longitudinal axis A. Furthermore, said Figure shows one of several radial axes $R_1$. The differential drive comprises a drive housing 11 which is partly broken away at the top end of the illustration. A differential carrier 14 is rotatably supported via two angular contact roller bearings 12, 13 in the drive housing 11. The effective lines of load of the roller bearings are marked $L_{12}$, $L_{13}$. The differential carrier comprises a central disc member 15 and two hollow journals 16, 17 which are aligned coaxially relative to the longitudinal axis A. The hollow journals rotatably support sideshaft gears 18, 19 which, in turn, run directly in the angular contact roller bearings 12, 13. The sideshaft gears are supported via friction bearing sleeves 20, 21 on the hollow journals 16, 17. The sideshaft gears 18, 19 engage a plurality of differential bevel gears of which there is shown a first differential bevel gear $22_1$ which is arranged coaxially relative to the radial axis $R_1$ and runs directly on a bearing pin $23_1$ which, in the direction of the radial axis $R_1$, is inserted into the differential carrier 14. The differential bevel gear $22_1$ is inserted into a broken-out section in the differential carrier 14 and is supported on the differential carrier via a stop disc 24. In a similar way, the sideshaft gears 18, 19 are axially supported on the differential carrier 14 via stop discs 26, 27. For sealing purposes, covers 28, 29 are inserted into the axially open sideshaft gears 18, 19. Outer joint parts 30, 31 are non-removably connected to the sideshaft gears, for example by a laser weld. Before the sideshaft gears and outer joint parts are connected, at least the inner races of the angular contact roller bearings 12, 13 have to be slipped on to the sideshaft gears 18, 19. The outer races of the angular contact roller bearings 12, 13 are axially secured by securing rings 32, 33 in the drive housing 11. The outer joint parts 30, 31 are partially positioned outside the drive housing 11 and are sealed towards the outside by plate metal sleeves 34, 35 and convoluted boots 36, 37 slipped on to the plate metal sleeves 34, 35. An annular flange 25 to which there is bolted a ring gear 38 by bolts 40 is formed on to the disc-shaped part 15 of the differential carrier 14. The ring gear 38 engages a driving pinion 39 which (in a way not illustrated) is supported in the drive housing 11. The ring gear 38 and the pinion 39 are shown in thin lines. Thus, the differential carrier 14 is indirectly supported in the drive housing 11 via the sideshaft gears 18, 19 and of the sideshaft gears 18, 19 have toothed engagement with the differential gears 22, which are exposed outside the differential carrier 14. Also, the rolling contact bearings 12, 13 are mounted between the sideshaft gears 18, 19 and the outer joint parts 30, 31 of the associated constant velocity universal joints.

Figure 2:
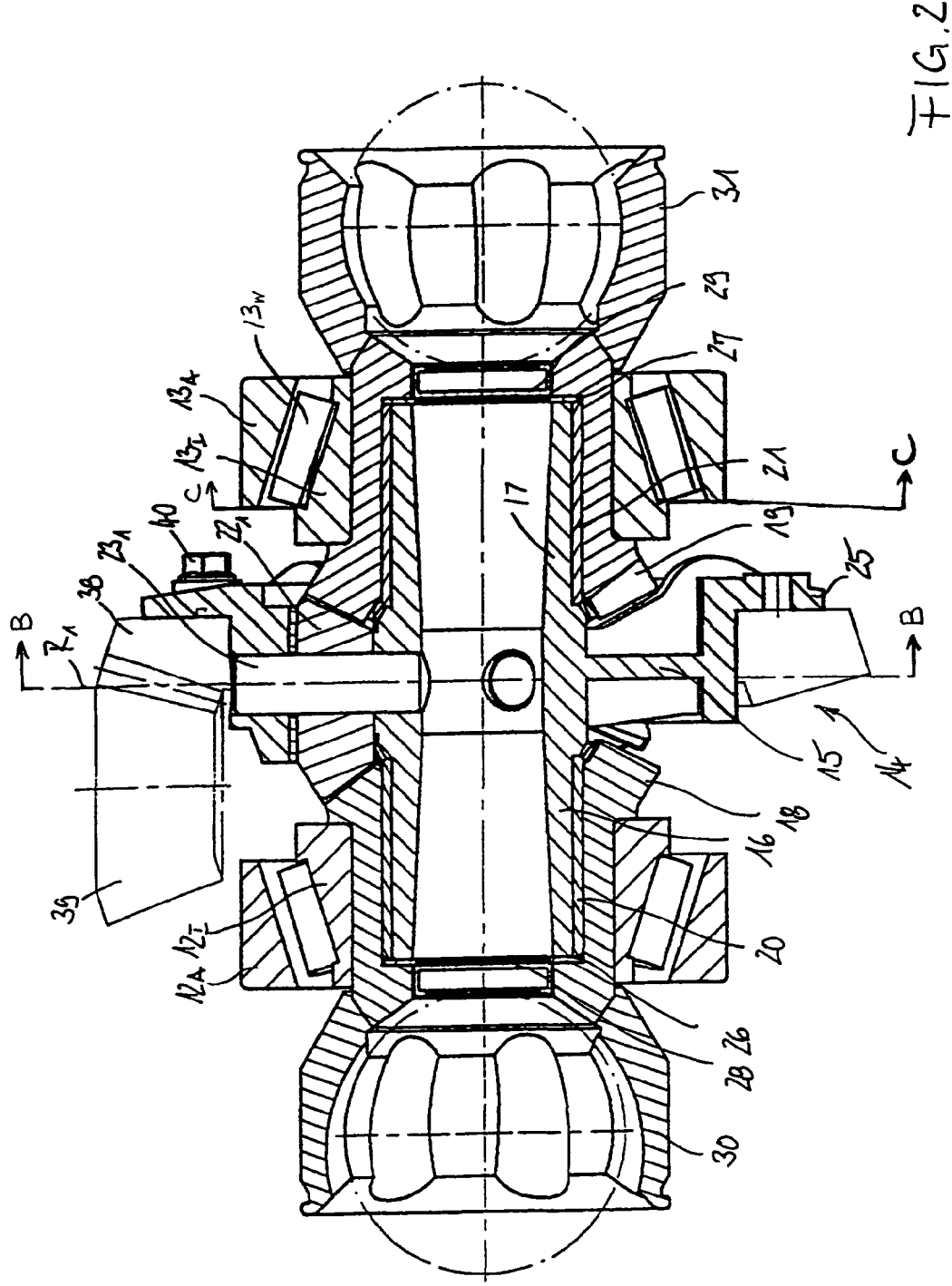
FIG. 2 shows a completed mounted differential carrier of a drive according to FIG. 1 with bearing mechanism.

FIG. 2 shows the pre-assembled differential carrier 14 with the sideshaft gears 18, 19 and one of the differential gears $22_1$. It is also possible to see the bearing mechanism, with the inner bearing races $12_I$, $13_I$ already having been slipped on to the sideshaft gears 18, 19. The outer bearing races $12_A$, $13_A$ of the angular contact bearings 12, 13 are thereafter axially slipped over the outer joint parts 30, 31 and permit an axial adjustment of the sideshaft gears 18, 19 on the differential carrier 14. Further identifiable details have been given the same reference numbers as in FIG. 1. To that extent, reference is made to the description of FIG. 1.

Figure 3:
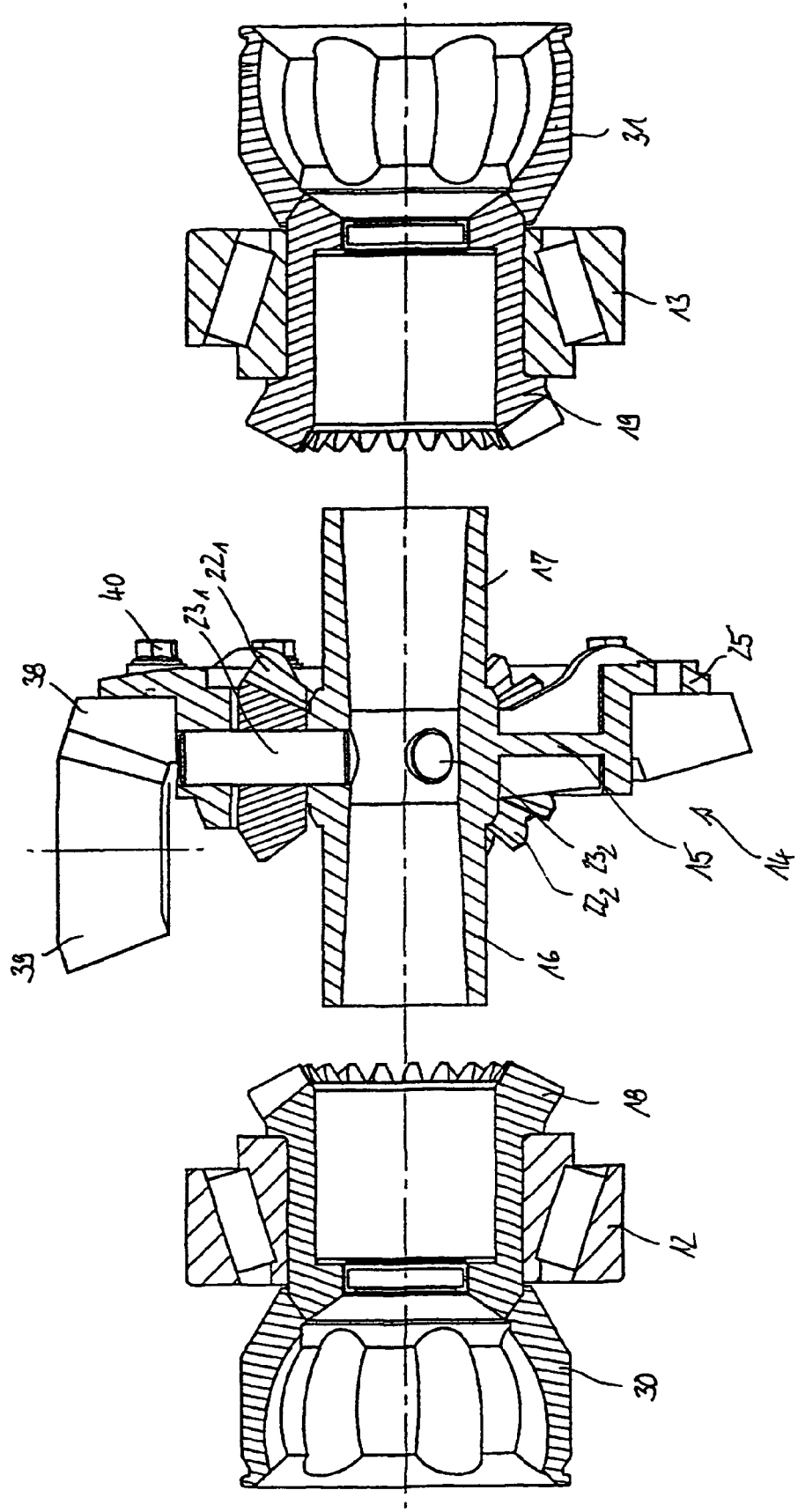
FIG. 3 shows three sub-assemblies of the assembly according to FIG. 2 in an exploded view.

FIG. 3 shows the assembly according to FIG. 2 divided into three sub-assemblies. In the center, there is shown the differential carrier 14 with the two hollow journals 16, 17 and the disc member 15 to which there is bolted the ring gear 38 by bolts 40. The differential bevel gears 22 and the journals 23, two of each of which are identifiable, are mounted to the differential carrier 14. Two sub-assemblies consisting of angular contact roller bearings 12, 13, sideshaft gears 18, 19 and outer joint parts 30, 31 welded thereto are separated from the differential carrier 14. In this illustration, the angular contact roller bearings 12, 13 are already finish-assembled, so that in this case it is not necessary for the outer bearing races to be slipped over the outer joint part. The driving pinion 39 which is actually independent of the differential carrier is also shown.

Figure 4:
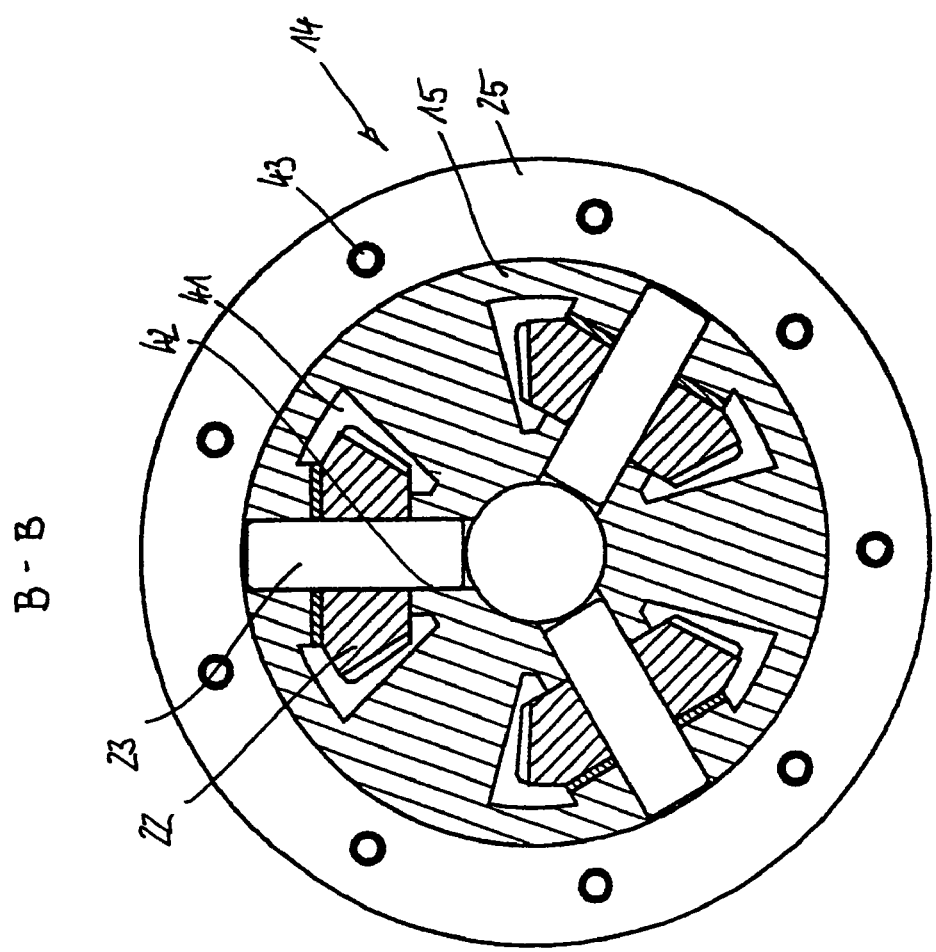
FIG. 4 shows the differential carrier according to FIG. 2 in a section according to line B—B.

FIG. 4 shows a section through the differential carrier according to line B—B in FIG. 2. It is possible to see the sectioned disc member 15 and the radial flange 25 of the differential carrier 14. In the disc member, there are provided three broken-out portions 41 with a 120° pitch angle. The broken out portions 41 accommodate the differential bevel gears 22 which are supported on the journals 23 which are inserted into the radial bores 42 in the differential carrier. In the flange 25, there are shown threaded holes 43 for the bolts 40 which secure the ring gear.

Figure 5:
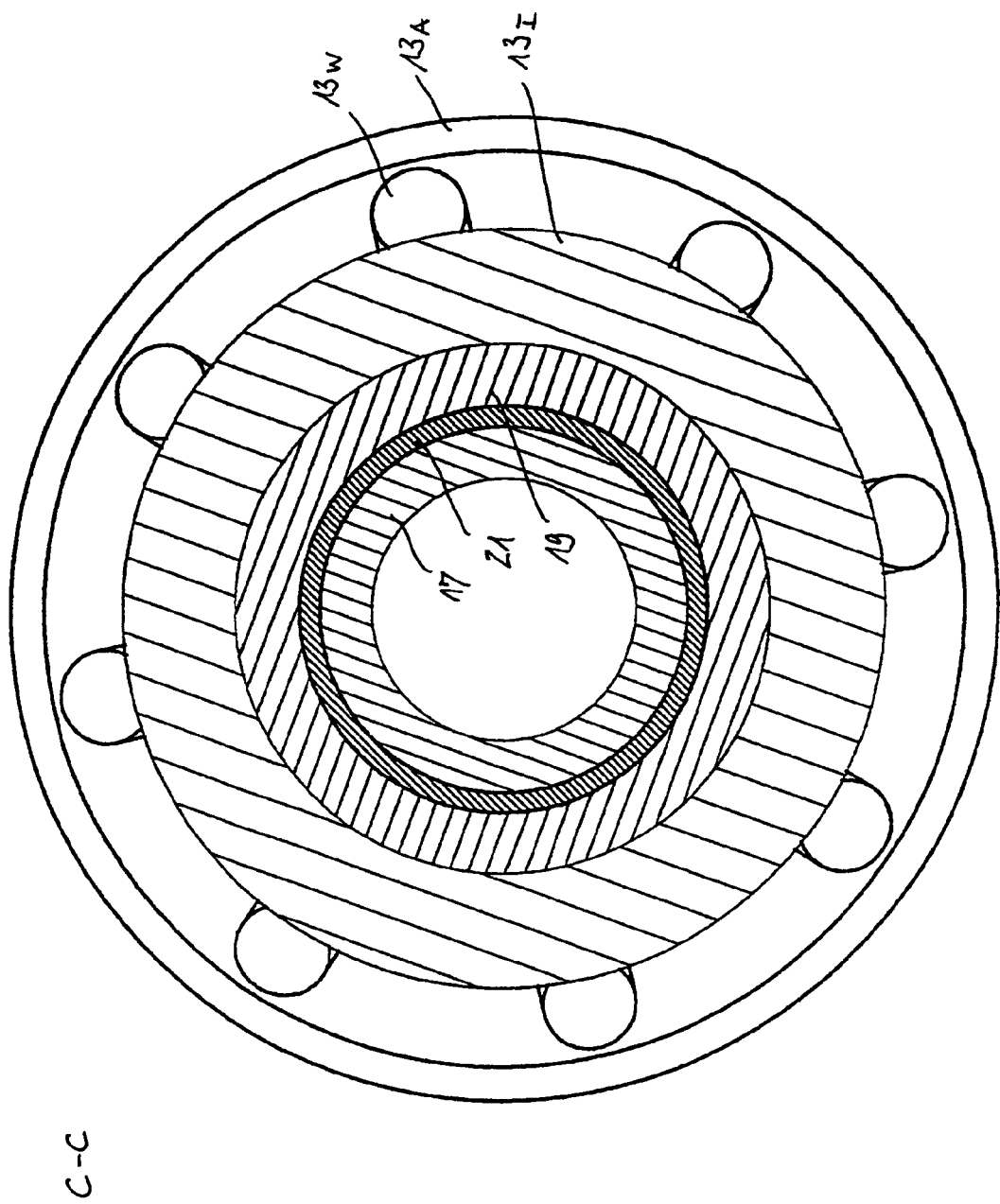
FIG. 5 shows the differential carrier according to FIG. 2 in a section according to line C—C.

FIG. 5 shows the differential carrier in a section along line C—C of FIG. 2. From the inside to the outside, there are shown the hollow journal 17, the friction bearing sleeve 21, the sideshaft gear 19 and the inner race $13_I$ of the angular contact roller bearing as well as rolling members $13_W$.

Figure 6:
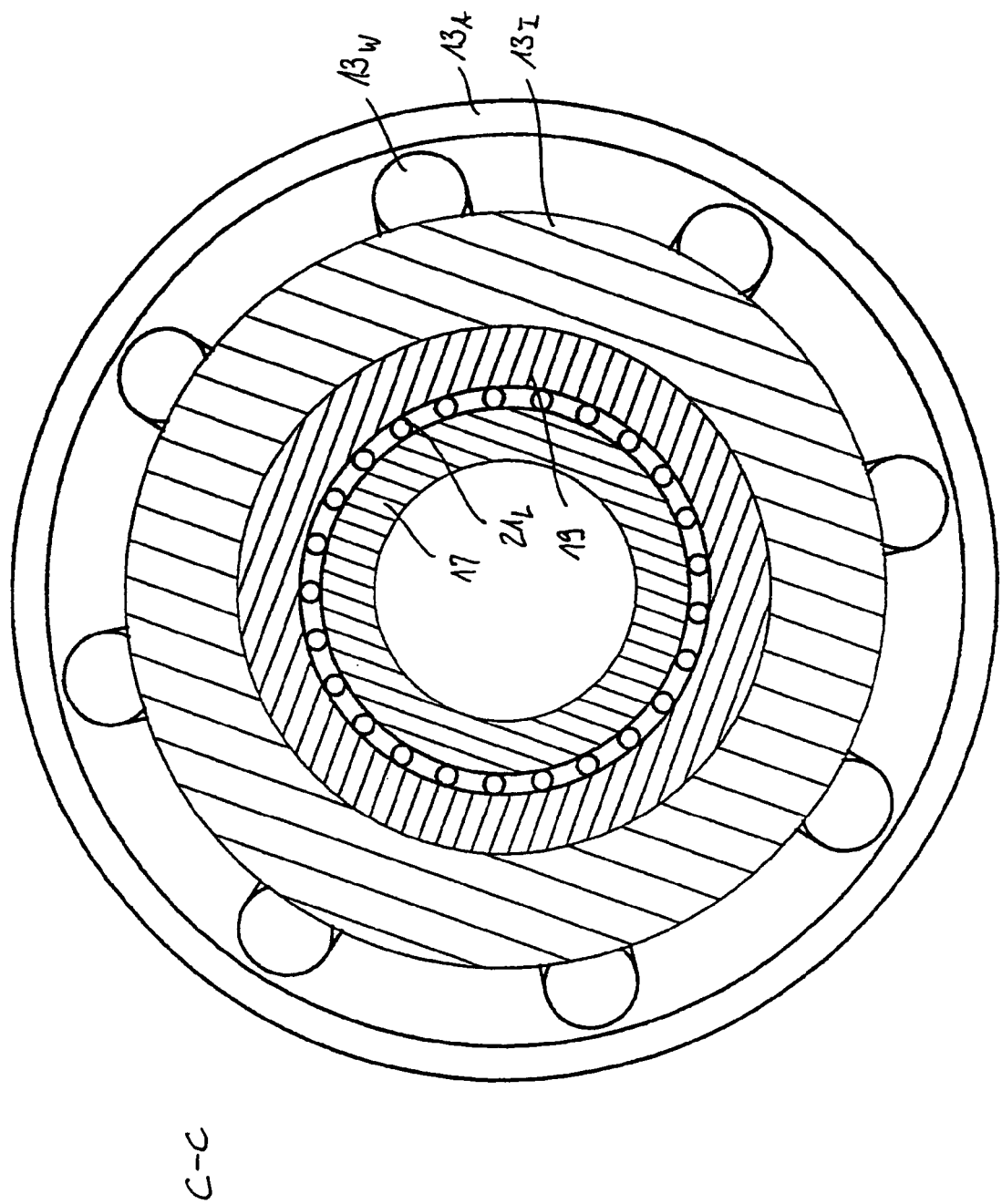
FIG. 6 shows the differential carrier according to FIG. 2 in a section according to line C—C in a second embodiment.

FIG. 6 shows a section through the differential carrier according to sectional line C—C of FIG. 2 in another embodiment. In this case, the friction bearing sleeve 21 has been replaced by a needle bearing $21_L$. Otherwise, the details are the same as those shown in FIG. 5 and to that extent, reference is made to the description thereof.

Figure 7:
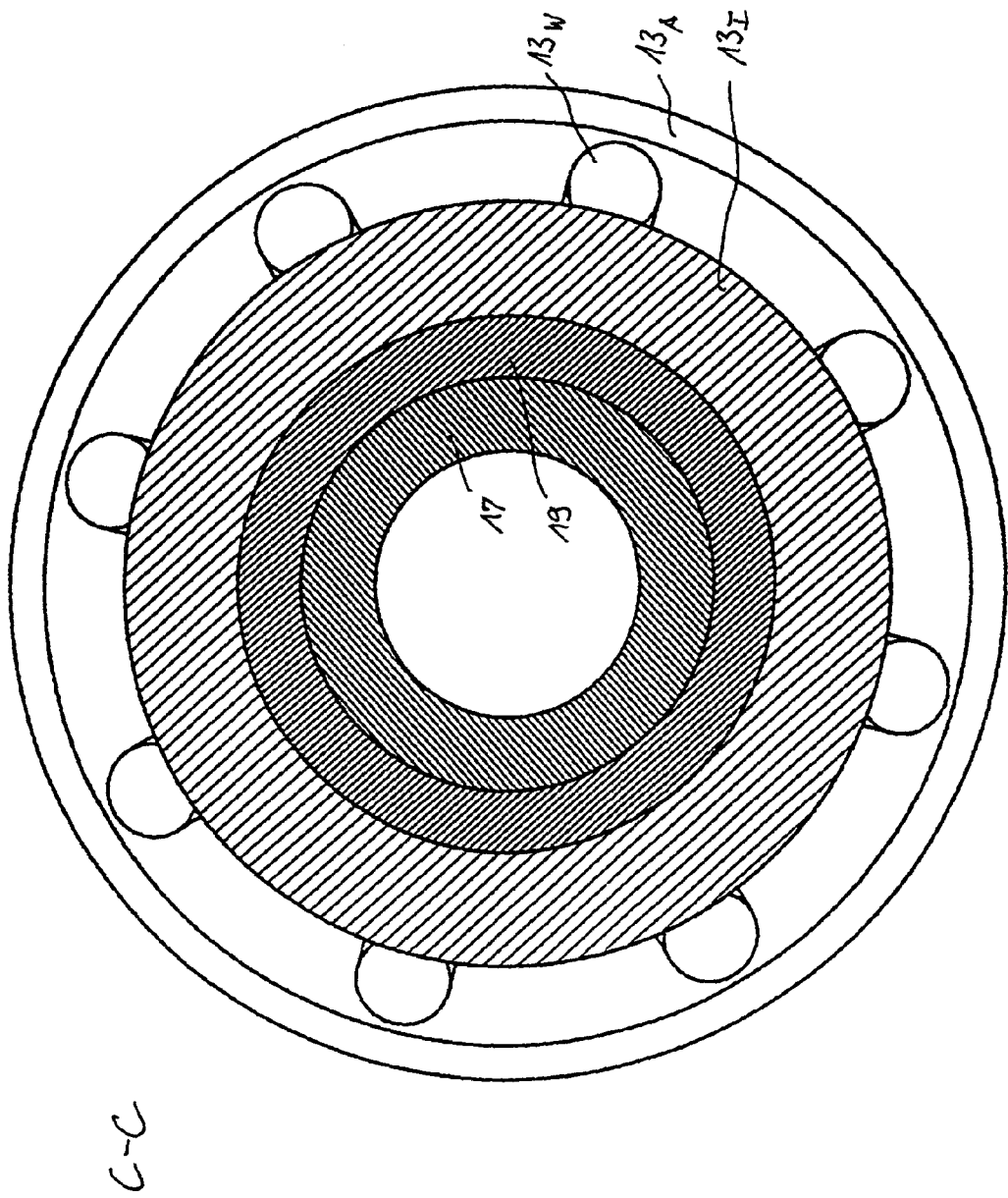
FIG. 7 shows the differential carrier according to FIG. 2 in a section according to line C—C in a third embodiment.

FIG. 7 shows a section through the differential carrier according to the sectional line C—C of FIG. 2 in a further embodiment. The friction bearing sleeve 21 has been eliminated without being replaced, so that the sideshaft gear 19 runs directly slidingly on the hollow journal 17. Otherwise, the details are the same as those shown in FIG. 5 and to that extent, reference is made to the description thereof.

While the invention has been described in connection with several embodiments, it should be understood that the invention is not limited to those embodiments. Thus, the invention covers all alternatives, modifications, and equivalents as may be included in the spirit and scope of the appended claims.

What is claimed is:

1. A differential drive comprising:
   a drive housing in which a differential carrier (14) is rotatably supported around its longitudinal axis (A);
   pre-assembled modules each comprising a sideshaft gear (18, 19), an outer joint part (30, 31) of a constant velocity joint and a rolling contact bearing (12, 13), the module being insertable into the drive housing (11), wherein the sideshaft gears (18, 19) are supported so as to be rotatable around said longitudinal axis (A) relative to the differential carrier (14) and are directly connected to the outer joint parts (30, 31) of the constant velocity joints; and
   differential gears (22) which are supported in the differential carrier rotatably around axes (R) extending radially relative to the longitudinal axis (A), said differential gears (22) engaging the sideshaft gears (18, 19) and rotating together with the differential carrier (14),
   wherein the differential carrier (14) forms journals (16, 17) which extend co-axially relative to the longitudinal axis (A) and by means of which the differential carrier (14) is rotatably supported in the sideshaft gears (18, 19) and wherein the sideshaft gears (18, 19) are rotatably supported in the drive housing (11), and wherein the rolling contact bearings (12, 13) are angular contact rolling bearings, and wherein outer bearing races (12$_A$, 13$_A$) of the angular contact rolling bearings (12, 13) have an inner diameter greater than the outer diameter of the outer joint parts (30, 31), so as to be axially slipped over the outer joint parts (30, 31).

2. A drive according to claim 1, wherein the sideshaft gears (18, 19) are supported by the rolling contact bearings (12, 13) in the drive housing (11).

3. A drive according to one of claim 1, wherein the regions of tooth engagement between the sideshaft gears (18, 19) and the differential gears (22) are located outside the differential carrier (14).

4. A drive according to claim 1, wherein the journals (16, 17) are coaxial hollow journals integrally connected to one another.

5. A drive according to claim 1, wherein the differential gears (22) are inserted into axial broken-out regions (41) in a radial disc member (15), said radial disc member forming a ring gear (38) in the differential carrier (14).

6. A drive according to claim 1, wherein the differential gears (22) are inserted into axial broken-out regions (41) in a radial disc member (15), said radial disc member adapted to secure a ring gear (38) in the differential carrier (14).

7. A drive according to claim 1, wherein the rolling contact bearings (12, 13) are axially fitted between the sideshaft gears (18, 19) and the outer joint parts (30, 31).

8. A drive according to claim 1, wherein the sideshaft gears (18, 19) are each welded to one of the outer joint parts (30, 31).

9. A drive according to claim 2, wherein the rolling contact bearings (12, 13) are angular contact roller bearings.

10. A drive according to claim 2, wherein effective lines (L$_{12}$, L$_{13}$) of load of the rolling contact bearings (12, 13) pass through bearing regions of the differential carrier (14) in the sideshaft gears approximately axially centrally.

11. A drive according to claim 1, wherein the journals (16, 17) are hollow.

12. A differential drive comprising:
   a drive housing in which a differential carrier (14) is rotatably supported around its longitudinal axis (A);
   sideshaft gears (18, 19) which are supported so as to be rotatable around said longitudinal axis (A) relative to the differential carrier (14); and
   differential gears (22) which are supported in the differential carrier rotatably around axes (R) extending radially relative to the longitudinal axis (A), said differential gears (22) engaging the sideshaft gears (18,19) and rotating together with the differential carrier (14),
   wherein the differential carrier (14) forms journals (16, 17) which extend co-axially relative to the longitudinal axis (A) and by means of which the differential carrier (14) is rotatably supported in the sideshaft gears (18, 19) and wherein the sideshaft gears (13, 19) are rotatably supported in the drive housing (11), and wherein the differential carrier (14) is supported by friction bearings (20, 21) in the sideshaft gears (18, 19).

13. A drive according to claim 12, wherein the friction bearings (20, 21) comprise friction sleeves.

* * * * *